(54) METHOD FOR DEFINING MPEP 4 ANIMATION PARAMETERS FOR AN ANIMATION DEFINITION INTERFACE

(75) Inventors: Erich Haratsch, Holmdel; Joern Ostermann, Red Bank, both of NJ (US)

(73) Assignee: AT&T Corp., Middletown, NJ (US)

(*) Notice: Subject to any disclaimer, the term of this patent is extended or adjusted under 35 U.S.C. 154(b) by 280 days.

(21) Appl. No.: 09/686,077

(22) Filed: Oct. 12, 2000

Related U.S. Application Data

(62) Division of application No. 09/031,728, filed on Feb. 27, 1998, now Pat. No. 6,154,222.

(51) Int. Cl.[7] .................................. G06F 15/00
(52) U.S. Cl. ........................................ 345/473
(58) Field of Search ............................. 345/473, 474, 345/475, 419, 418

(56) References Cited

U.S. PATENT DOCUMENTS

| | | | | |
|---|---|---|---|---|
| 5,854,634 A | * | 12/1998 | Kroitor | 345/473 |
| 6,154,222 A | * | 11/2000 | Haratsch et al. | 345/473 |

FOREIGN PATENT DOCUMENTS

| WO | WO 98/06069 A | 2/1998 |
|---|---|---|

OTHER PUBLICATIONS

Li–An Tang et al., Analysis–Based Facial Expression Synthesis, IEEE, Pages Nov. 1994, pp. 98–102.

Takaaki Akimoto et al., 3D Facial Model Creation Using Generic Model and Front and Side View of Face, IEEE, vol. #75–D, No. 2, Mar. 1992, pp. 191–197.

Choi C S et al., Analysis and Synthesis of Facial Image Sequences in Model–Based Image Coding, IEEE, vol. 4, No. 3, Jun. 1994, pp. 257–275.

Haratsch E et al., Parameter–Based Animation of Arbitrary 3D Head Models, Picture Coding Symposium, PCS97 Berlin, Germany, Sep. 1997, pp. 81–84.

Doenges P K et al., Audio/Video and Synthetic Graphics/Audio for Mixed Media Signal Processing, Image Communication, vol. 0, No. 4, XP004075338, May 1997, pp. 433–463.

International Search Report, PCT/US/98/04308, May 3, 1998.

* cited by examiner

*Primary Examiner*—Phu Nguyen
(74) *Attorney, Agent, or Firm*—Banner & Witcoff, Ltd.

(57) ABSTRACT

A process is defined for the rapid definition of new animation parameters for proprietary renderers. The process accommodates the peculiarities of proprietary models. In a first step, a proprietary model is animated in a standard modeler and the animated models are saved as VRML files. A converter is used to extract the meaning of a newly defined animation parameter by comparing two or more of the VRML files. Thus, the output of this process is the model and a table describing the new animation parameter. This information is read by the renderer and used whenever the animation parameter is required. The process can easily be used to generate new shapes from the original model.

34 Claims, 1 Drawing Sheet

METHOD FOR DEFINING MPEP 4 ANIMATION PARAMETERS FOR AN ANIMATION DEFINITION INTERFACE

This application claims Division, to application Ser. No. 09/031,728 filed Feb. 27, 1998 and entitled "Method For Defining Animation Parameters For An Animation Definition Interface," now U.S. Pat. No. 6,154,222.

The present invention generally relates to the field of computer animation and more particularly, is directed to a method for defining animation parameters for an animation definition interface.

BACKGROUND OF THE INVENTION

In recent years, advances in personal computer hardware has made it possible to process audio and digital images on the desktop. These advances were aided by the development of sophisticated formats and standards for coding audio-visual information, such as movies, video, music and the like, in digital compressed formats. Such formats allow large amounts of audio/video data to be processed with relatively low cost equipment.

Under the direction of the International Standards Organization (ISO) and the International Electro-Technical Commission (IEC), the "Moving Picture Experts Group" ("MPEG") was established to development the MPEG suit of standards for coding moving pictures and audio. The major advantage of MPEG over other video and audio standards is said to be much smaller file size for the same quality due to the efficient compression techniques employed.

MPEG encoded video files are typically "played" on a PC, Mac or other consumer electronics device using an MPEG video player and MPEG audio files are "played" using an MPEG audio player. Such players are readily available to PC users and the number of MPEG encoded video and audio files is steady growing.

As the need for more demanding and varied encoding schemes for video and audio content continue to increased, MPEG has been derived into the following categories:

MPEG 1—Coding of moving pictures and associated audio for digital storage media at up approximately 1.5 Mbit/s;

MPEG 2—Generic coding of moving pictures and associated audio information; and

MPEG 4—Coding of audio-visual objects.

Along with the development of MPEG, real-time animation on the desk top also has gained popularity in recent years. Many real-time animation programs, including upcoming MPEG-4 terminals with face and body animation capabilities, can be used to run a proprietary renderer using a proprietary face or body model. Usually, animation of a proprietary model is not compatible with MPEG-4 requirements. Furthermore, the current implementation and modification of animation parameters, like smiles or eyebrow movement, with these renderers is cumbersome and time consuming. Thus, there is a need in the art for an improved method of processing animation parameters.

SUMMARY OF THE INVENTION

Accordingly, it is an object of the present invention to obviate the above-noted shortcomings and disadvantages of real-time animation processes known in the prior art.

Another object of the present invention is to provide an animation definition interface for an MPEG renderer which can be easily and inexpensively implemented allowing for animation of arbitrary downloaded models in the MPEG-4 terminal.

It is another object of the present invention to provide an inexpensive and easily followed method for real-time animation.

The above mentioned disadvantages of prior art real-time animation with MPEG compliant renderers can be eliminated or substantially reduced by the present invention. In accordance with the invention, a method is provided that allows the rapid definition of animation parameters for proprietary models downloaded from an MPEG-4 encoder and their inclusion into proprietary real-time rendering software that might also be MPEG-4 compliant. The proprietary model can be read into any commercially available modeler. The modeler is then used to define the behavior of different animation parameters. For each animation parameter, a modified model is created and stored. Model analysis software, known as an animation definition interface, compares the original model with the animated model and extracts the essential animation parameters which represents the differences between the original and modified models. These parameters are stored in tables and are used by the real-time animation program to generate the desired expressions.

BRIEF DESCRIPTION OF THE DRAWINGS

The novel features of the present invention are set out with particularity in the appended claims, but the invention will be understood more fully and clearly from the following detailed description of the invention as set forth in the accompanying drawings, in which:

DESCRIPTION OF THE PREFERRED EMBODIMENT

The MPEG-4 standard described above strives to define a standardized interface to allow animation of face and body models within an MPEG-4 terminal. Due to the rapid advances in computer graphics hardware, it is not foreseen that MPEG-4 will standardize face and body models. Instead, face and body definition parameters ("FDP", "BDP") are defined for specifying the shape and surface of a model. For the animation of the models, face and body animation parameters ("FAP", "BAP") are standardized.

These animation parameters include low-level parameters like "move left eyebrow up" and "tongue roll" as well as high-level parameters like "smile". Assuming that different terminals allow for models with different degrees of complexity, a process is required that allows the rapid development of models suited for animation. The use of standardized file format like Virtual Reality Modeling Language ("VRML") allow the use of commonly available modeling software (modelers), like COSMO 3D or PowerAnimator, to design animations. However, formats like VRML 1, VRML 2, and OpenInventor only support the description of rigid objects.

VRML was conceived in the early part of 1994 and was developed in response to a need for a three dimensional graphical visualization standard. VRML 1.0 was the first version of the standard and provided basic support for describing three dimensional objects such as spheres, planes, cubes cylinders, cones and the like.

Version 2.0 of the VRML standard built on the progress of Version 1.0 by adding such capabilities as object behavior.

Face and body animation requires flexible deformation. Such a feature is not currently conveniently supported by OpenInventor or VRML 2. Accordingly, real-time renders which are designed to read and write VRML or OpenInventor files must be modified in order to accommodate animation. In addition, convenient editors for defining the animation capabilities are not known in the prior art.

In accordance with the present invention, an interface between a modeler, e.g., Alias/Wavefront Power Animator, and real-time animation software is provided. The present invention allows for the rapid definition, modification and implementation of animation parameters. Since the interface reads VRML files from the modeler, it is independent of the modeler. The interface writes a VRML file and one accompanying table for each defined animation parameter thus making this information easily integrate able into proprietary renderers.

Figure 1:
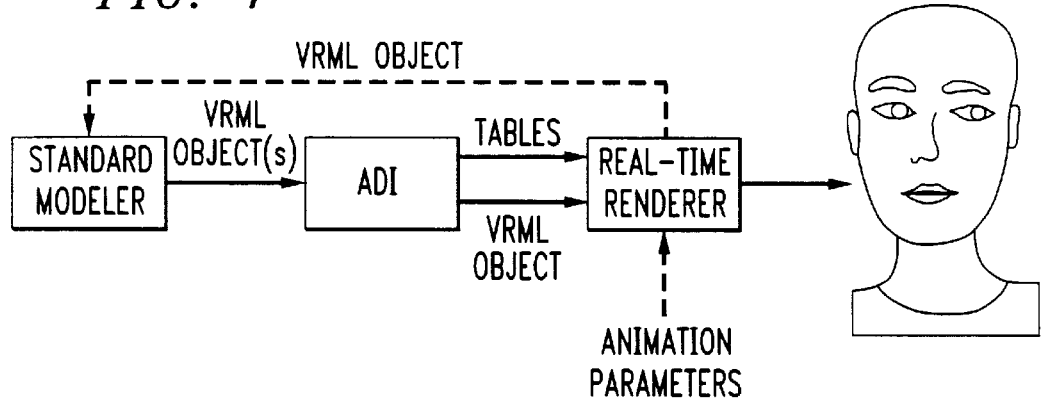
FIG. 1 illustrates how the animation definition interface of the present invention is integrated with a modeler and renderer.

The interface of the invention takes as its input several VRML files describing static models with a topology appropriate for the renderer. FIG. 1 illustrated how the system is integrated with the modeler and the renderer. The model of the renderer is exported as a VRML file and read into the modeler. In order to design the behavior of the model for one animation parameter, the model is deformed using the tools of the modeler. Usually, restrictions on the topology of the model exist. For simplicity, it is assumed that the model is deformed only by moving relevant vertices and not by changing its topology. The modeler exports the deformed model as a VRML file.

The Animation Definition Interface ("ADI") compares the output of the modeler with its input,i.e., the model exported from the renderer. By comparing vertex positions of the two models, the vertices affected by the newly designed animation parameter can be identified. The ADI computes for each affected vertex a 3D displacement vector defining the deformation and exports this information in a table.

The renderer reads the VRML file of the model and the table in order to determine the definition of the new animation parameter. The renderer can now use the newly defined animation as required by the animation parameters.

Most of the newly available graphics boards for PCs and workstations support rendering based on the OpenGL engine. The VRML 2 file format is based on OpenInventor that itself is based on OpenG1. Thus, it is essential to enable real-time deformations of models rendered on an OpenGl engine. Use of a scene graph usually does not allow the movement of parts of an object. Therefore, the vertex positions of the scene graph are updated through the animation parameters as defined in the table. Only the vertex coordinates of the scene graph are updated thus allowing one to take full advantage of the OpenGl rendering engine speed for global motions, lighting texture mapping, etc.

Figure 2:
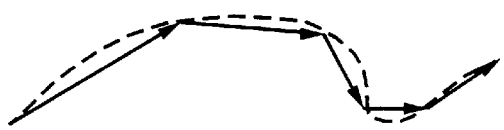
FIG. 2 illustrates the piece-wise linear approximation of a complex deformation applied to a vertex of the uniform model.

The conversion process described above allows the renderer to only create deformations of moving vertices along the defined 3D displacement vector. While this might be sufficient for simple actions like move "left eye brow up", complex motions like "smile" or "tongue roll up" can not be sufficiently modeled by linearly moving vertices. Thus, in accordance with the present invention, several VRML files are created for different phases of the animation or values of the animation parameter. Such files allow for a piece-wise linear approximation of complex deformations. This process is illustrated in FIG. 2.

The following table shows an example of an animation parameter ("AP") definition for 2 vertices, where the 3-D motion is defined in 3 intervals. The parameter AP is positive and in Interval 1 is valid for 0<AP<=0.33, in Interval 2 is valid for 0.33<AP<=0.66 and in Interval 3 is valid for 0.66<AP<=1.0.

| Vertex No. | $1^{st}$ Interval | $2^{nd}$ Interval | $3^{rd}$ Interval |
| --- | --- | --- | --- |
| 5 | (0.1, 0.7, −5) | (0, 2, 4) | (0, 0.1, −0.1) |
| 13 | (3, 4, −2) | (3, 2, 4) | (−1, −2, −3) |

Given AP=0.3, vertex 5 would be displaced by:

$$0.3 \times (0.1, 0.7, -5)^T.$$

For AP=0.6, vertex 5 would be displaced by:

$$0.33 \times (0.1, 0.7, -5)^T + (0.6 - 0.33) \times (0, 2, 4)^T.$$

The above approach can be extended in order to allow positive and negative animation parameters as well as unequal intervals for defining the motion of a vertex. Other extensions include replacing the linear approximation of the vertex motion by general functions like polynomials. These functions could be different for each animation parameter. A further generalization is to make these functions dependent on more than one animation parameter.

For a smile, writing three files with "smile=0.3", "smile=0.7" and "smile=1.0" are sufficient to allow for a subjectively pleasant piece-wise linear approximation of this relatively complex deformation.

The above outlined procedure can be used to define the entire set of MPEG-4 FAPs for a proprietary face animation renderer. The model is an extension of Parke's model. Applicants have found that FAPs integrate nicely with the model's talking capability controlled by a TTS system.

Figure 3:
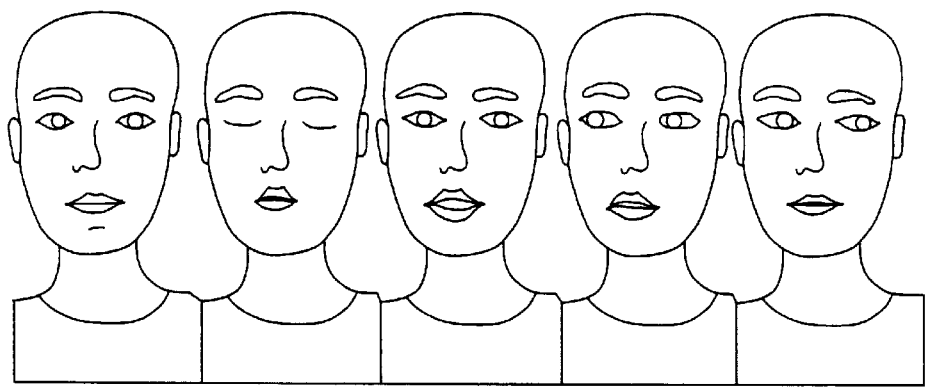
FIG. 3 illustrates the use of MPEG-4 for animation of computer graphics heads by synthetic speech and animation parameters.

Animated sequences using different personalities also are illustrated in FIG. 3.

Arbitrary head models in VRML and animation tables can be created in two ways, a natural for personalized head models and a synthetic one.

In the natural approach, a VRML model of a person's head is created by, for example, using cyberscan data. The animation table is generated by image analysis. Images of the person are taken in a neutral state and for each facial expression corresponding to the different animation parameters. The method described above could be used to calculate the displacement vectors for IndexedFaceSet nodes. Applying this algorithm for different intensities of the person's expression improves the realism of the facial movements during animation. An animation system which downloads a person's data obtained in this way represents a new architecture for a primitive model-based decoder.

An example of how the present invention may be implemented will now be described.

| ASCII Specifiction - FDP | | | | | |
|---|---|---|---|---|---|
| 000 | 000 | exposedField | SFNode | featurePointsCoord | NULL |
| 001 | 001 | exposedField | SFNode | textureCoord4Feature Points | NULL |
| 010 | 010 | exposedField | SFNode | calibrationMesh | NULL |
| 011 | 011 | exposedField | SFNode | faceTexture | NULL |
| 100 | 100 | exposedField | MFNode | animationDefinition-Tables[] | NULL |
| 101 | 101 | exposedField | SFNode | faceSceneGraph | NULL |

The FDP node defines the face model to be used at the receiver. Two options can be supported:

1. calibration information is downloaded, so that the proprietary face of the receiver can be configured using facial feature points and optionally a 3D mesh or texture; and
2. a face model is downloaded with the animation definition of the Facial Animation Parameters. This face model replaces the proprietary face model in the receiver.

Each field may be described as follows:

featurePointsCoord
   contains a Coordinate node. Specifies feature points for the calibration of the proprietary face. The coordinates are listed in the 'point' field in the Coordinate node in the prescribed order, that a feature point with a lower label is listed before a feature point with a higher label (e.g. feature point 3.14 before feature point 4.1).

textureCoord4-Feature Points
   contains a TextureCoordinate node. Specifies the texture coordinates for the feature points.

calibrationMesh
   contains an IndexedFaceSet node. Specifies a 3D mesh for the calibration of the proprietary face model. All fields in the IndexedFaceSet node can be used as calibration information.

faceTexture
   contains an ImageTexture or PixelTexture node. Specifies texture to be applied on the proprietary face model.

animationDefinitiontables
   contains AnimationDefinitionTable nodes. If a face model is downloaded, the behavior of FAPs is defined in this field.

faceSceneGraph
   contains a Group node. Grouping node for face model rendered in the compositor. Can also be used to download a face model: in this case the effect of Facial Animation Parameters is defined the 'animationDefinitionTables' field.

Other ASCII specifications are set forth in the tables below:

| | ?? | | AnimationDefinitionTable | | | |
|---|---|---|---|---|---|---|
| 00 | field | SFInt | fapID | 1 | 1 | 68 |
| 01 | field | SFInt | highLevelSelect | 1 | 1 | 64 |
| 10 | 0 exposedfield | MFnode | table [] | NULL | | |

| | ?? | | AnimationDefTransform | |
|---|---|---|---|---|
| 00 | field | ?? | nodeIDTransform | "" |
| 01 | field | SFString | fieldID | na |
| 10 | field | GenericSF | fieldValue | na |

| | | ?? | AnimationDefIndexedFaceSet | |
|---|---|---|---|---|
| 00 | field | ?? | nodeIDIndexedFaceSet | |
| 01 | field | MFInt32 | intervalBorders [] | |
| 10 | field | MFint32 | coordIndex [] | |
| 11 | field | MFVec3f | displacements [] | |

While the present invention has been described with respect to a preferred embodiment, the invention is not limited thereto. In general, this version is applicable when defining animation parameters defining flexible deformation of computer graphic models. The scope of the invention is limited only by the attached claims.

We claim:

1. A method for defining a set of computer animation parameters for an object to be animated electronically, wherein said animation is achieved by electronically altering at least a portion of said object in a controlled manner, said method comprising the steps of:
   obtaining an electronic reference model of said object to be animated;
   altering said reference model to form a modified model corresponding to a first animation parameter;
   determining the physical differences between said reference model and said modified model and storing said differences as said first animation parameter;
   repeating said altering and said determining steps for each of said animation parameters to be defined; and
   providing said stored parameters to a rendering device for generation of said animation in accordance with said stored parameters.

2. The method of claim 1 further including the step of storing said animation parameters as a lookup function in a table.

3. The method of claim 2 further including the step of converting said animation parameters to a format for downloading to rendering device along with said reference model.

4. The method of claim 1 further including the definition of an object as a scenegraph and the definition of high level animation parameters to allow rigid and flexible deformation.

5. The method of claim 4 wherein said high level animation parameters correspond to rigid motion and rigid and flexible deformation.

6. The method of claim 4 further including the step of downloading said object to a client that animates the model.

7. The method of claim 4 further including the step of downloading said object to a player that animates the model with animation parameters.

8. The method of claim 1 further including the step of defining a major animation parameter, said step includes the sub-steps of:
   defining a plurality of associated animation parameters representing an animation sequence; and
   storing said plurality of associated animation parameters as said major parameter.

9. The method of claim 8 further including the step of defining a plurality of said major animation parameters, wherein each of said major animation parameters presents a different animation sequence.

10. The method of claim 9 further including the step of defining a super animation parameter, said step includes the sub-steps of:

combining a plurality of said major animation parameters; and storing said plurality of major animation parameters as said super animation parameter.

11. The method of claim 9 further including the step of defining a plurality of said major animation parameters, wherein each of said major animation parameters presents a different human expression.

12. The method of claim 1, wherein said object includes characteristics of a human being and said method further includes the step of defining a major animation parameter representing a human expression, said step includes the sub-steps of:

defining a plurality of animation parameters representing said human expression; and storing said plurality of animation parameters as said major parameter.

13. The method of claim 12 further including the step of storing said animation parameters as functions in a look up table.

14. The method of claim 12, wherein said major animation parameter represents a smile.

15. The method of claim 12, wherein said major animation parameter represents a frown.

16. The method of claim 12, wherein said major animation parameter represents the movement of an eye.

17. The method of claim 12, wherein said major animation parameter represents an eye wink.

18. The method of claim 12, wherein said major animation parameter represents a tongue roll.

19. The method of claim 12, wherein said major animation parameter represents the movement of a mouth.

20. The method of claim 12, wherein said major animation parameter represents simulated speech.

21. The method of claim 12, wherein said major animation parameter represents a human gesture.

22. The method of claim 12, wherein said major animation parameter represents visemes.

23. The method of claim 12, wherein said major animation parameter represents deformation at the joints of a simulated human skeleton.

24. The method of claim 1, wherein said animation is described by spline functions.

25. The method of claim 1, wherein said animation is described by rational polynomial functions.

26. The method of claim 1, wherein said animation is described by general functions.

27. The method of claim 11 further including the step of defining a super animation parameter, said step includes the sub-steps of:

combining a plurality of said major animation parameters; and storing said plurality of major animation parameters as said super parameter.

28. The method of claim 1, wherein said determining step includes the sub-step of comparing the vertex positions of said modified model to the vertex positions of said reference model.

29. The method of claim 28, wherein said determining step further includes the step of determining said animation parameters in accordance with the differences between said vertex positions of said modified model and said vertex positions of said reference model.

30. The method of claim 29 wherein said determining step further includes computing a spline function from a plurality of differences.

31. The method of claim 29 wherein said determining step further includes computing arbitrary functions.

32. The method of claim 29 wherein said determining step further includes the step of computing three dimensional displacement vectors defining the differences between said vertex positions of said modified model and said vertex positions of said reference model.

33. The method of claim 32 wherein said determining step further includes the step of storing said displacement vectors in a table as said animation parameters.

34. The method of claim 1, wherein said determining step includes the step of approximating the differences between said reference model and said modified model and storing said differences as said first animation parameters.

* * * * *

UNITED STATES PATENT AND TRADEMARK OFFICE
CERTIFICATE OF CORRECTION

PATENT NO.     : 6,483,513 B1
DATED          : November 19, 2002
INVENTOR(S)    : Erich Haratsch el. al.

It is certified that error appears in the above-identified patent and that said Letters Patent is hereby corrected as shown below:

<u>Title page, Item [54] and Column 1, lines 1-3,</u>
Title should read "METHOD FOR DEFINING MPEP 4 ANIMATION PARAMETERS FOR AN ANIMATION DEFINITION INTERFACE" has been replace with -- METHOD FOR DEFINING MPEG 4 ANIMATION PARAMETERS FOR AN ANIMATION DEFINITION INTERFACE --.

Signed and Sealed this

Twenty-second Day of April, 2003

JAMES E. ROGAN
*Director of the United States Patent and Trademark Office*